Oct. 4, 1932. W. H. DE LANCEY 1,880,869
LIQUID DISPENSING APPARATUS
Filed Jan. 28, 1932  2 Sheets-Sheet 1
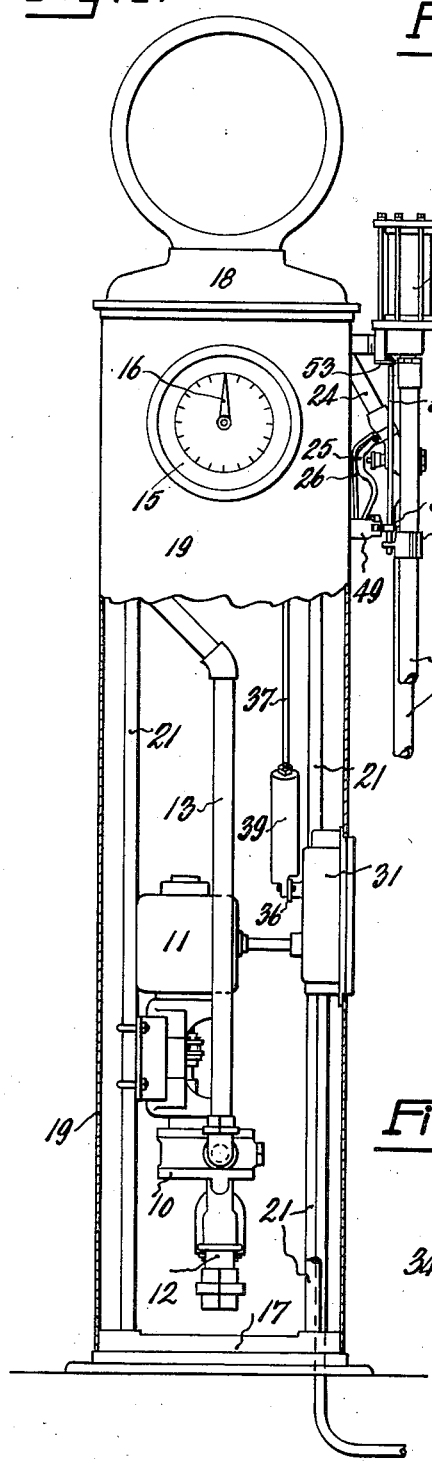
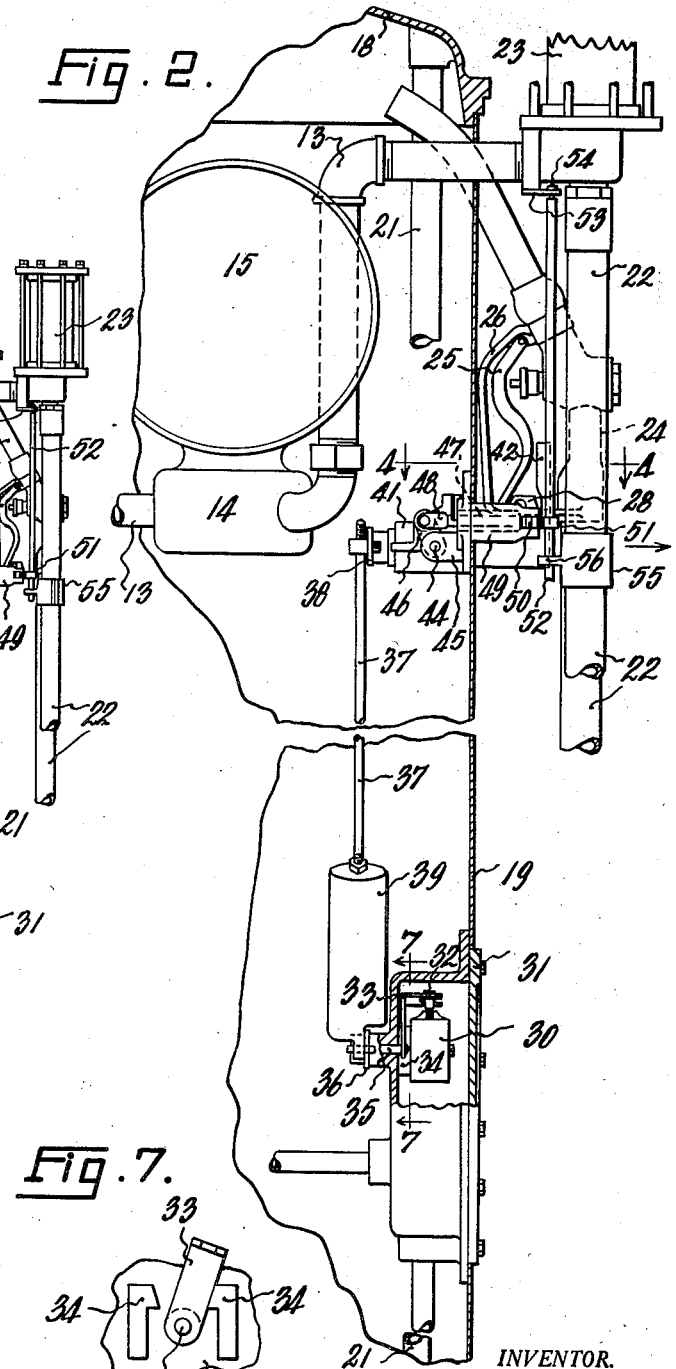
INVENTOR.
WARREN H. DE LANCEY
BY
ATTORNEYS.

Oct. 4, 1932.                W. H. DE LANCEY                1,880,869
                        LIQUID DISPENSING APPARATUS
                        Filed Jan. 28, 1932         2 Sheets-Sheet 2
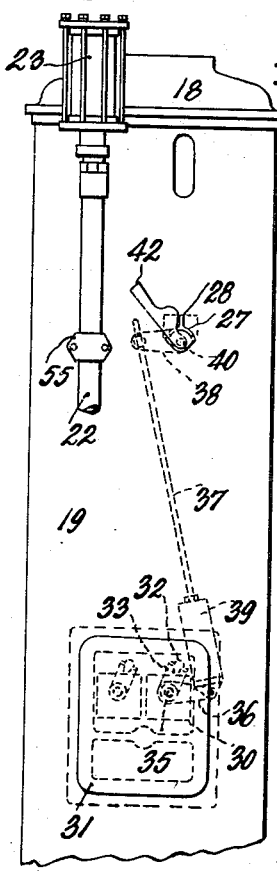
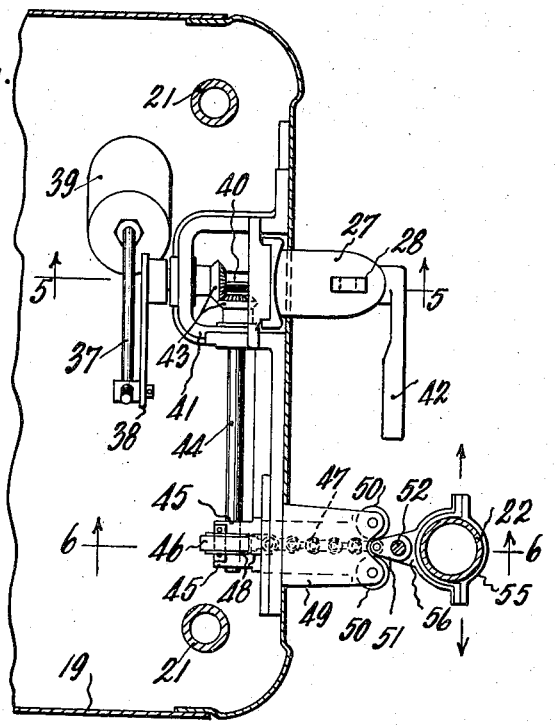
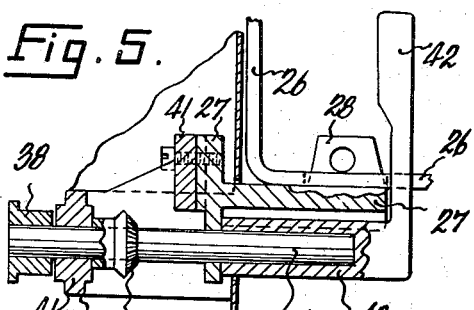
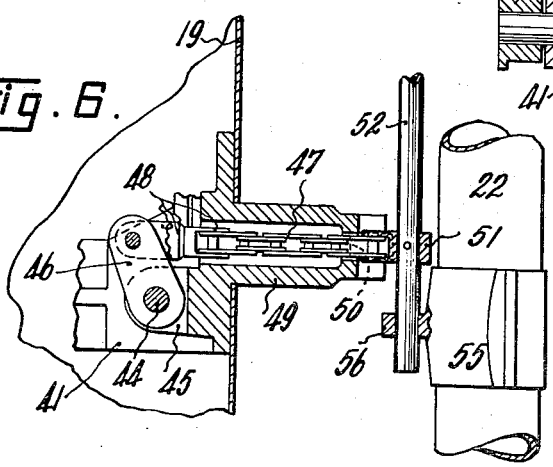
INVENTOR.
WARREN H. DE LANCEY
BY
ATTORNEYS.

Patented Oct. 4, 1932

1,880,869

UNITED STATES PATENT OFFICE

WARREN H. DE LANCEY, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

LIQUID DISPENSING APPARATUS

Application filed January 28, 1932. Serial No. 589,396.

This invention relates to improvements in flow controlling mechanism for dispensing systems. It is particularly applicable to the control of a liquid pumping system, such as is used for dispensing, and usually measuring gasoline, although it is not necessarily confined to such use. The particular type of flow control mechanism, with which the invention is concerned, is that in which control of the flow may be effected from a remote point, such for example as at the discharge end of the hose, by mechanism actuated by a pull on the hose or a bending or deflection of the same.

The invention has for an object to provide an improved mechanism for the purpose, which is substantially fool proof, of sturdy construction calculated to stand up under rough usage, and of a construction such as to function surely and effectively under all sorts of severe conditions encountered in practical service.

The invention also has for an object the provision of a flow control mechanism which includes a flexible connection between a rigid operating member for the flow control element and the hose, and which will function properly and smoothly irrespective of the direction in which the hose is pulled or deflected, within the limits of a wide range, say at least 180 degrees.

A particular object of the invention is to provide for the connection of the flexible member indirectly to the hose, through the intermediary of a rigid member mounted parallel with the hose and supported at one end, near the fixed support for the hose, in a manner to permit swinging movement in all directions. This rigid member, near its other end, has a slip connection with the hose which enables relative vertical movement therebetween. Such arrangement is important as avoiding binding of the flexible member, when the hose is pulled from any angle.

These and other objects will more particularly appear as the detailed description proceeds and will be pointed out in the appended claims.

The invention will be disclosed with reference to the accompanying drawings, in which:

Fig. 1 is a small scale front elevational view, partly in section, of a gasoline dispensing apparatus embodying my invention;

Fig. 2 is a fragmentary sectional elevational view thereof, drawn to a larger scale;

Fig. 3 is a fragmentary exterior elevational view of the apparatus taken at right angles to Fig. 1;

Fig. 4 is a sectional plan view taken on the line 4—4 of Fig. 2;

Fig. 5 is a sectional elevational view taken on the line 5—5 of Fig. 4;

Fig. 6 is a fragmentary sectional view taken on the line 6—6 of Fig. 4; and

Fig. 7 is a sectional view taken on the line 7—7 of Fig. 2.

In these drawings, the invention has been disclosed, by way of illustrative example, in connection with a well known type of gasoline dispensing and measuring apparatus. Briefly, the apparatus shown includes a suitable pump 10 (Fig. 1), driven by an electric motor 11. Gasoline is drawn up from the underground supply tank through a suction pipe, shown in part at 12, and forced by the pump through a discharge pipe 13. Interposed in pipe 13 is a suitable device, such as a meter 14 (Fig. 2), to measure the quantity of liquid passing through pipe 13. The indications of the meter are shown on a dial 15 (Fig. 1) by a pointer 16. This apparatus is usually enclosed in a suitable housing, such as that shown, which comprises base and cap members 17 and 18, respectively, and a sheet metal casing 19 enclosing the space between them. The base and cap are tied together by a series of pipe columns 21 and these serve to support the motor and pump, as indicated, as well as other parts later to be described. The discharge pipe 13 passes out of the housing, near the upper end thereof, and is connected to a flexible hose 22, usually through the intermediary of some suitable flow indicating device, such as 23. The discharge end of hose 22 is generally equipped with a valved nozzle 24,—that shown having a valve operating lever 25 and a guard 26 for the same.

The nozzle, when not in use, is usually hung up on a fixed support, such as that shown at 27, which has an upstanding lug 28, passing through a slot in the guard, as indicated in Fig. 2 and best shown in Fig. 5. This lug may be utilized, if desired, to prevent movement of lever 25 in a direction such as to open the valve of nozzle 24. When liquid is to be dispensed, the nozzle 24 is removed from its support 27 and carried to the point of delivery, the flow being controlled (after pumping has been started) by the nozzle valve operated by lever 25.

The problem of this invention relates to controlling the liquid forcing means, whatever its particular character may be, from a remote point, such as the delivery point for example. In the present case, the operator, remotely stationed at the discharge end of the hose must be able to start and stop the motor 11 but the liquid forcing means may take various forms and the invention is not necessarily limited in all its features to the remote control of an electric motor, although that is the form herein shown and now preferred. The particular expedient adopted to secure the remote control is one which is broadly old and suggested in numerous patents in the prior art,—viz., the utilization of a pull on the hose to effect the operation of some suitable flow control element, such as a switch or valve or both, as may be necessary or desirable with the particular form of liquid forcing means used. This invention is concerned more particularly with the mechanism interposed between the hose and the switch or other member to be operated, and provides a distinctly better, more practical and substantially fool proof mechanism for the purpose in view.

The flow control element, in the form of the invention illustrated herein, consists of a switch, shown conventionally at 30 (Figs. 2 and 3), for controlling motor 11. Switch 30 is mounted within a box 31 and its operating lever 32 is engaged in the forked upper end of an arm 33. This arm, which is movable between fixed stops 34 (Fig. 7), is fixed at its lower end to a stub shaft 35 mounted in the rear wall of the box. Fixed to the outer end of shaft 35 is an arm 36 which is interconnected by a link 37 to an arm 38, located thereabove, and the link carries a weight 39 which tends to move arm 36 to and hold it in such position that switch 30 is open. Arm 38 is fixed to the rear end of a shaft 40, which is rotatably supported in a frame 41, suitably secured to the casing 19, and extends beyond this frame and outside of the casing to carry a handle 42, fixed thereto. This handle is intended for use in manually operating switch 30. The hose support 27 is secured to frame 41 (see Figs. 4 and 5). Shaft 40 is connected by bevel gears 43 to one end of a laterally-disposed, horizontal shaft 44, also rotatably supported in frame 41. The other end of this shaft is journalled in a pair of spaced lugs 45 on frame 41 and located between these lugs and fixed to shaft 44 is an upstanding arm 46. A sprocket chain 47 is connected at one end, through the intermediary of a double clevis 48 (Figs. 2 and 6), to the upper end of arm 46. Chain 47 extends forwardly of this arm through a hollow housing 49, which is formed as an integral part of frame 41 and projects through the casing 19 and outwardly beyond the same, terminating closely adjacent the hose 22 with an open end. Mounted at such end for turning movement about vertical axes are a pair of rolls 50 (Figs. 2 and 4), disposed one on each side of chain 47. The free end of this chain is pivotally connected to a short arm 51 fixed to a depending supporting rod 52, near the lower end thereof. The rod 52 is supported from a plate 53, fixed to the flow indicating device 23, and is free for swinging movement in all directions. The upper end of rod 52 is necked down and this necked down portion passes loosely through a hole in plate 53. A flange 54 on the upper end of rod 52, holds it against downward movement. Fixed to hose 22 is a two part clamp 55, one part of which has formed thereon a perforated ear 56, through which the lower end of rod 52 freely passes.

If the hose is pulled forwardly, in the direction indicated by the arrow in Fig. 2, or to the right or left, in directions indicated by the arrows in Fig. 4, the pull will be communicated through clamp 55 and ear 56 to rod 52 and this rod will be swung causing arm 51 to pull on the chain 47 and move arm 46 forwardly, turning shafts 44 and 40 and moving arm 38 in the right direction to lift arm 36 and close switch 30. If the movement of the hose is forwardly, the rolls 50 do not have any important function but if the hose is pulled to the right or left, one or the other roll comes into play, being engaged by the chain and enabling the same to move freely around the corner. A freely moving flexible connection between the hose 22 and arm 46 is thus provided and this is particularly important because the operator cannot be relied on to use care in the direction in which he pulls the hose. He simply gives it a yank without any thought to the direction of its movement and such direction is just as liable to be at right angles to the normal forward movement (as shown by the arrows in Fig. 4) or at any angle in between. Bending of the flexible connection, even under these rather severe conditions, must be avoided and the arrangement disclosed accomplishes the purpose very effectively and by simple and inexpensive means.

It is important to provide means for preventing operation of the switch when the pump is locked up at night. The parts are shown in "lock up" position in Fig. 2. The lug 28 is perforated to receive a padlock which holds the hose nozzle 24 to its support 27. Access to the nozzle, or operation of the same, is then prevented. Still one could pull on the hose and effect a closing of the motor switch 30 unless means were provided to prevent such action. It is also desired to insure opening of the switch 30 before the hose nozzle can be placed in "lock up" position. Usually the hose, when released by the operator, will be pulled back by weight 39 into the normal position shown in Fig. 2 and an opening of the switch will automatically result. However, there is a remote possibility that the hose might become twisted or caught on some obstruction in such a way that its return to normal position by weight 39 would be prevented. In such case, the operator will be forced, by the means to be described, to open the switch before he can hang up the hose nozzle in "lock up" position.

Handle 42 is arranged so that when positioned vertically it interferes with the placing of the hose nozzle 24 on support 27. This will be clear from Fig. 3. Thus, the operator is compelled to move lever 42 into the position shown in Fig. 3 before he can hang up the nozzle on the support and, when he does so, the switch 30, if not already opened, will be opened and in any case it is positively locked in open position. The handle 42 swings in a path just in front of the free end of support 27 and thus in non-interfering relation therewith but, when the nozzle is placed on the support, it projects beyond such end and into said path to block movement of the handle as will be clear from Figs. 2, 3 and 5. When a padlock is applied to lug 28, the nozzle is not only locked in inactive position but handle 42 is also locked in the position of Fig. 3 and this insures that the switch 30 is open and locked in open position against movement by the normal operating means, which are actuated by a pull on the hose. Thus, with the parts in "lock up" position, a pull on the hose 22 is rendered ineffective to effect operation of the switch.

The operation of the apparatus will next be described. Assuming that the hose nozzle 24 is in "lock up" position on its support 27, as shown in Fig. 2, the operator first removes the nozzle from the support, thus clearing the obstruction in the path of movement of handle 42. The switch is now unlocked and free for operation in the normal manner by a pull on the hose 22. The operator, in serving a customer, carries the nozzle 24 to the tank to be served, which is usually sufficiently remote from the pump so that the operator cannot easily reach the same to operate a control element, such as 42 for example. However, he can readily pull on the hose and that pull is made to operate the switch 30 through the transmission chain of connected elements 56, 52, 47, 46, 44, 43, 40, 38, 37, 36, 35 and 33. When the pull on the hose is relaxed, the weight 39 pulls it back and restores the switch operating mechanism to normal position and the switch 30 to open position. When the dispensing operation is over, the operator hangs up nozzle 24 on support 27 but, before this can be done, handle 42 must be moved to the position shown in Fig. 3, thereby opening the switch, if not already open, and locking it in open position against operation by an accidental pull on hose 22.

While the idea of utilizing a pull on a hose as means of actuating a motor switch, or other equivalent flow control element is old, there are important novel features in the particular mechanism herein disclosed for the purpose. The arrangement, whereby the hose when pulled from any angle over a wide range (at least 180 degrees), operates a transmission chain of pivotally connected parts smoothly and effectively, is thought to be important as providing a distinctly better and more nearly fool proof mechanism for the purpose in view.

It is to be noted that, instead of connecting chain 47 directly to the hose clamp 55, it is indirectly connected thereto through the intermediary of the rigid rod 52, which at its upper end is mounted to swing in all directions. The use of such rod is most important for several reasons. It prevents binding of the flexible connection 47 because it furnishes a support for the outer end of the same and keeps such end located in the proper horizontal position. The use of this rod also renders unnecessary the careful and accurate setting of the clamp 55 on the hose. Such clamp, having a slidable connection with rod 52, can be applied to the hose in various positions within substantial limits and still function properly. Again, on an upthrow of the hose, the clamp can slide relatively to rod 52 and avoid the application to the chain of any upwardly directed force which would cause binding. In a sense too, the rod 52, lying alongside and parallel with the hose, prevents the hose from uncontrolled bending near its upper end. But even if it does bend in an undesired way, the rod 52 nevertheless moves in controlled paths, which are accurately predeterminable, and by connecting the chain 47 to the rod 52 one can plan in advance for free movement of the chain in any desired direction of movement of the rod 52. Then by interconnecting the rod and hose by a slip connection, which allows relative vertical movement, the hose can bend as it pleases without causing binding of the chain even when the hose is pulled from the extreme angles indicated in Fig. 4. This slip connection also enables the hose, if accidentally torn from its support, to pull free from rod 52 and thereby avoid damage to the switch control mechanism.

The invention has been disclosed herein, in an embodiment at present preferred for illustrative purposes, but the scope of the invention is defined by the appended claims rather than by the foregoing description.

What I claim is:

1. In a dispensing system, a discharge conduit, a flexible hose attached thereto, an element movable to control the flow through said pipe and hose, a rigid member mounted alongside the hose in substantially parallel relation and supported near one end and near the point of attachment of the hose to said conduit for swinging movement in all directions, a member fixed to the hose and connected to said rigid member for sliding movement in the direction of the axis of the hose, a flexible element connected to said rigid member, and means connecting the flexible element to said first named element.

2. A dispensing apparatus, comprising, a casing, a discharge conduit within said casing and having an end extending outwardly through said casing, a flexible hose connected to said end of the conduit and depending therefrom alongside the casing; means for forcing fluid through said conduit and hose, an element in said casing movable from one position to another to start and stop said forcing means, yieldable means tending to hold said element in position to stop said forcing means, a rod supported at its upper end for universal swinging movement at a point near the point of connection of said hose and conduit and extending downwardly alongside the hose in closely adjacent relation therewith, means connecting said rod near its lower end to the hose for relative vertical movement, and connections between said element and rod.

3. A dispensing apparatus, comprising, a casing, a discharge conduit within said casing and having an end extending outwardly through said casing, a flexible hose connected to said end of the conduit and depending therefrom alongside the casing, means for forcing fluid through said conduit and hose, an element in said casing movable from one position to another to start and stop said forcing means, yieldable means tending to hold said element in position to stop said forcing means, a rod supported at its upper end for universal swinging movement at a point near the point of connection of said hose and conduit and extending downwardly alongside the hose in closely adjacent relation therewith, means connecting said rod near its lower end to the hose for relative vertical movement, and connections between said element and rod including a flexible element extending horizontally out through said casing and radially toward said hose.

4. A dispensing apparatus, comprising, a casing, a discharge conduit within said casing and having an end extending outwardly through said casing, a flexible hose connected to said end of the conduit and depending therefrom alongside the casing, means for forcing fluid through said conduit and hose, an element in said casing movable from one position to another to start and stop said forcing means, yieldable means tending to hold said element in position to stop said forcing means, a hollow housing extending outwardly from said casing and radially toward said depending hose, a pair of rolls mounted in laterally spaced relation in the outer end of said housing to turn about vertical axes, and connections from said element to said hose including a flexible element passing out of the casing through said housing and between said pairs of rolls.

5. A dispensing apparatus, comprising, a casing, a discharge conduit within said casing and having an end extending outwardly through said casing, a flexible hose connected to said end of the conduit and depending therefrom alongside the casing, means for forcing fluid through said conduit and hose, an element in said casing movable from one position to another to start and stop said forcing means, yieldable means tending to hold said element in position to stop said forcing means, a hollow housing extending outwardly from said casing and radially toward said depending hose, a pair of rolls mounted in laterally spaced relation in the outer end of said housing to turn about vertical axes, a rod supported at its upper end for universal swinging movement at a point near the point of connection of said hose and conduit and extending downwardly alongside the hose in closely adjacent relation therewith, means connecting said rod near its lower end to the hose for relative vertical movement, and connections from said element to said rod including a flexible element passing out of the casing through said housing and between said pair of rolls.

6. A dispensing apparatus, comprising, a casing, a discharge conduit within said casing and having an end extending outwardly through said casing, a flexible hose connected to said end of the conduit and depending therefrom alongside the casing, means for forcing fluid through said conduit and hose, an element in said casing movable from one position to another to start and stop said forcing means, yieldable means tending to hold said element in position to stop said forcing means, operating connections for said element including a flexible member extending outwardly through said casing and radially toward said hose, and means connecting the outer end of said flexible member to the hose with freedom for relative movement in a direction axially of the hose.

7. A dispensing apparatus, comprising, a casing, a discharge conduit within said casing and having an end extending outwardly through said casing, a flexible hose connected to said end of the conduit and depending therefrom alongside the casing, means for forcing fluid through said conduit and hose, an element in said casing movable from one position to another to start and stop said forcing means, yieldable means tending to hold said element in position to stop said forcing means, operating connections for said element including a flexible member extending outwardly through said casing and radially toward said hose, suspension means movable in predeterminable paths for supporting the outer end of said flexible member, and a slip connection between said suspension means and hose enabling relative movement therebetween in a direction axially of the hose.

In testimony whereof I have affixed my signature.

WARREN H. DE LANCEY.